United States Patent
Rinchiuso et al.

[19]

[11] Patent Number: 6,144,651
[45] Date of Patent: Nov. 7, 2000

[54] DATA TRANSMISSION WITHIN A WIRELESS COMMUNICATION SYSTEM

[75] Inventors: Joseph Rinchiuso, Melrose Park; Kenneth A. Felix, Crystal Lake, both of Ill.

[73] Assignee: Motorola, Inc., Schaumburg, Ill.

[21] Appl. No.: 09/118,639

[22] Filed: Jul. 17, 1998

[51] Int. Cl.[7] .................................................. H04B 7/216
[52] U.S. Cl. ......................... 370/335; 370/328; 370/338
[58] Field of Search ................................. 370/270, 441, 370/280, 347, 352, 401, 381, 432, 244, 250; 455/500, 517

[56] References Cited

U.S. PATENT DOCUMENTS

| | | | |
|---|---|---|---|
| 5,495,508 | 2/1996 | Kaewell | 370/280 |
| 5,737,333 | 4/1998 | Civanlar | 370/352 |
| 5,748,617 | 5/1998 | McLain | 370/244 |
| 5,812,552 | 9/1998 | Arora | 370/401 |
| 5,867,689 | 2/1999 | McLain | 395/500.44 |
| 5,898,686 | 4/1999 | Virgile | 370/381 |
| 5,912,882 | 6/1999 | Yafuso | 370/270 |
| 5,995,839 | 11/1999 | Coursey | 455/445 |

FOREIGN PATENT DOCUMENTS

WO97/47094   12/1997   WIPO .
WO97/47149   12/1997   WIPO .

OTHER PUBLICATIONS

W. Fenner Xerox PARC, "Internet Group Management Protocol, Version 2", Nov. 1997, Network Working Group, Request for Comments:2236, Updates: 1112.

S. Deering, Stanford University, "Host Extensions for IP Multicasting", Aug. 1989, Network Working Group, Request for Comments: 1112; Obsoletes: RFCs 988, 1054.

*Primary Examiner*—Douglas W. Olms
*Assistant Examiner*—Ricardo M. Pizarro
*Attorney, Agent, or Firm*—Kenneth A. Haas

[57] ABSTRACT

In order to reduce messaging within a wireless communication system an emulator (137) is provided that receives multicast packet data from a router (138). The multicast packet data is transmitted from a server (120) and destined to at least one remote unit (113–117). The emulator (137) additionally receives control data for the current multicast session from the router (138). The first set of data is transmitted to the remote unit (113–117) and the emulator (137) responds to the control data (via a response message (134)) without transmitting the control messages to the remote unit (113–117).

11 Claims, 6 Drawing Sheets

DATA TRANSMISSION WITHIN A WIRELESS COMMUNICATION SYSTEM

FIELD OF THE INVENTION

The present invention relates generally to communication systems and, in particular, to data transmission within a wireless communication system.

BACKGROUND OF THE INVENTION

Next generation wireless communication system architecture must be able to provide an array of services comparable to wire-line services. One such service envisioned for the next generation Code Division Multiple Access (CDMA) architecture is multicasting. By definition, multicasting is a method which provides the delivery of information to multiple destinations without transmitting the same information content to each destination separately.

Typically, wireline multicasting generates a great deal of messaging in the network, which is unacceptable in a wireless environment. More particularly, because each signal transmitted in a CDMA system is typically transmitted in the same frequency band, a majority of the noise associated with a received signal can be attributed to other simultaneous transmissions. The magnitude of noise is directly related to the amount of data that is simultaneously transmitted within the communication system. Thus it is beneficial for a communication system to transmit as little as possible in order to reduce the overall system noise.

Therefore, a need exists for a method and apparatus for data transmission in a wireless communication system that minimizes the number of messages transmitted to a remote unit.

DETAILED DESCRIPTION OF THE DRAWINGS

To address the need for data transmission in a communication system that minimizes the number of messages transmitted to a remote unit, an emulator is provided that receives multicast packet data from a router. The multicast packet data is transmitted from a server and destined to at least one remote unit. The emulator additionally receives control data for the current multicast session from the router. The packet data is transmitted to the remote unit and the emulator responds to the control data (via a response message) without transmitting the control messages to the remote unit. Because control data for the current multicast session is not transmitted to the remote unit over the air interface, the amount of messaging within the communication system is reduced, resulting in reduced system interference.

The present invention encompasses a method for data transmission within a wireless communication system. The method comprises the steps of receiving a first set of data and a second set of data, the second set of data representative of control messages for the first set of data. Next, the first set of data is transmitted to a remote unit and the second set of data is responded to without transmitting the second set of data to the remote unit.

Another aspect of the invention encompasses a method comprising the steps of receiving a request from a wireless remote unit to initiate a transmission from the remote unit and determining, at cellular infrastructure equipment, unused addresses. The unused address are transmitted to the remote unit for use in transmitting data from the remote unit.

Yet another aspect of the invention encompasses an apparatus for data transmission within a wireless communication system. The apparatus comprises an emulator having a first set of data and a second set of data as inputs, and outputting the first set of data for transmission over an air interface to a remote unit, while outputting a response to the second set of data without transmitting the second set of data to the remote unit.

Figure 1:
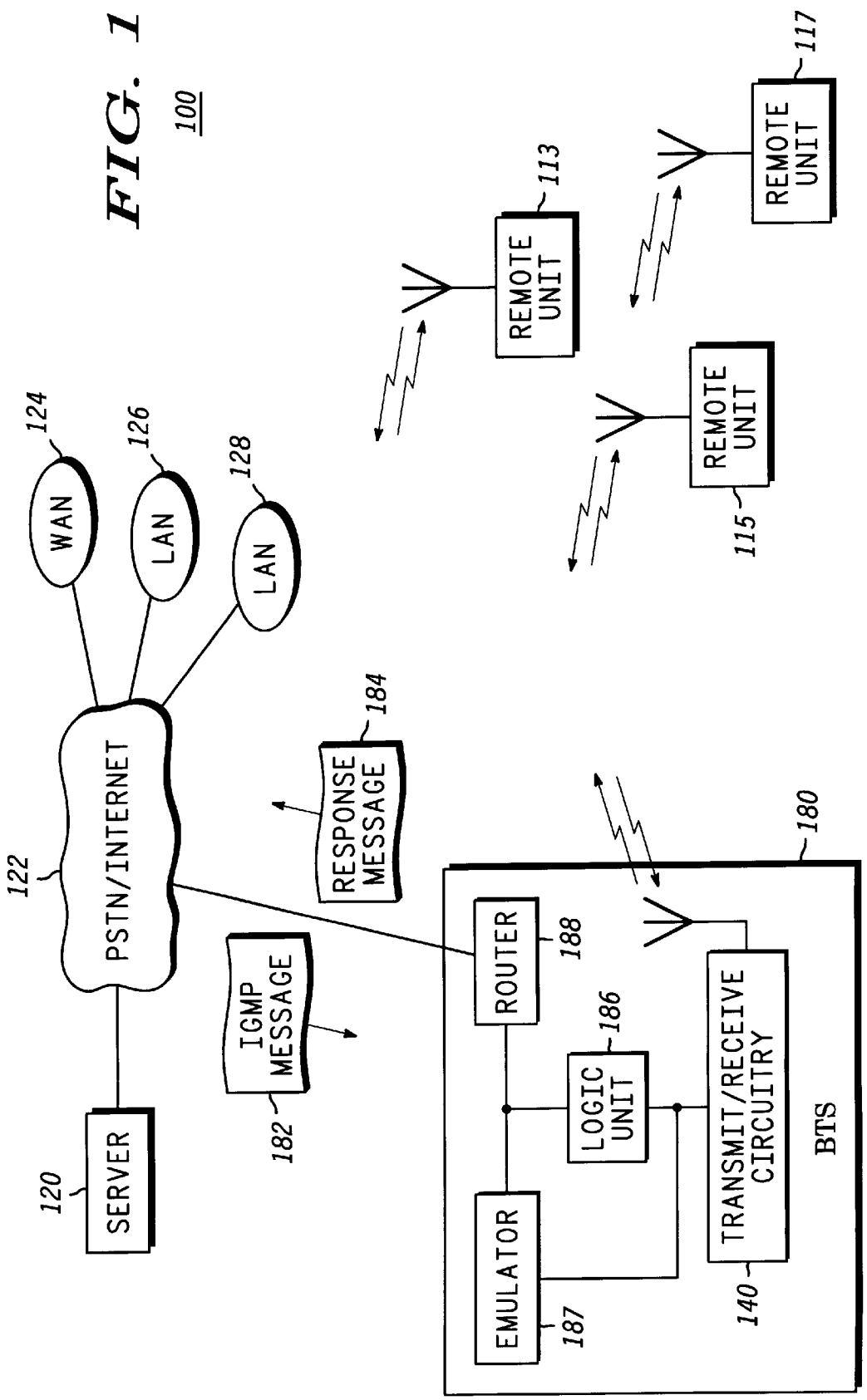
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a next generation CDMA architecture as described in the cdma2000 International Telecommunication Union-Radiocommunication (ITU-R) Radio Transmission Technology (RTT) Candidate Submission document, but in alternate embodiments communication system 100 may utilize other analog or digital cellular communication system protocols such as, but not limited to, the next generation Global System for Mobile Communications (GSM) protocol, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008). Communication system 100 includes server 120, Public Switched Telephone Network (PSTN) 122, Base Transceiver Station (BTS) 130, emulator 137, and remote units 113–117. Although not shown, communication system 100 comprises well known network elements such as Mobile Switching Centers (MSCs), Centralized Base Station Controllers (CBSCs), and the like.

In the preferred embodiment of the present invention server 120 is capable of providing a multicasting session over PSTN/internet 122 to clients such as Local Area Networks 126–128, Wide Area Network 124, and BTS 130. More particularly, server 120 utilizes the Internet Group Management Protocol (IGMP) as described in Request for Comments (RFC) document 1112 and RFC 2236 of the Internet Engineering Task Force (IETF) to provide multicasting. Remote units 113–117 that wish to receive a multicast session, monitor a multicast advertisement message on a system broadcast channel to determine a session to receive. Broadcast channels are part of the common forward physical/paging channel as described in Mobile Station-Base Station Compatibility Standards for Dual-Mode Wideband Spread Spectrum Cellular Systems, Telecommunications Industry Association Interim Standard 95A, Wash., D.C. July 1993 (IS-95A), which is incorporated by reference herein.

In the preferred embodiment of the present invention, advertisement messages include information about multicast events available to remote units 113–117. The information includes the session's Internet Protocol (IP) address, port number, time and duration of the transmission, and a brief description of the event.

Base station 130 will join a multicast session and forward it over the air interface via a high-speed data channel (supplemental channel) if there is at least one remote unit 113–117 that requested participation in the session. Once a remote unit requests participation in the multicast event, a common supplemental channel is assigned to the remote unit, and the multicast session is broadcast to all remote units currently participating in the multicast event. As discussed in greater detail below, the common supplemental channel utilizes two unique spreading codes for channel assignment, with one of the spreading codes being a function of the multicast session address that is broadcast by server 120. Additionally, in order to minimize messaging over the air interface, emulator 137 is utilized to emulate messaging that normally occurs between server 120 and any device receiving the multicast (e.g., remote units receiving the multicast session).

Figure 2:
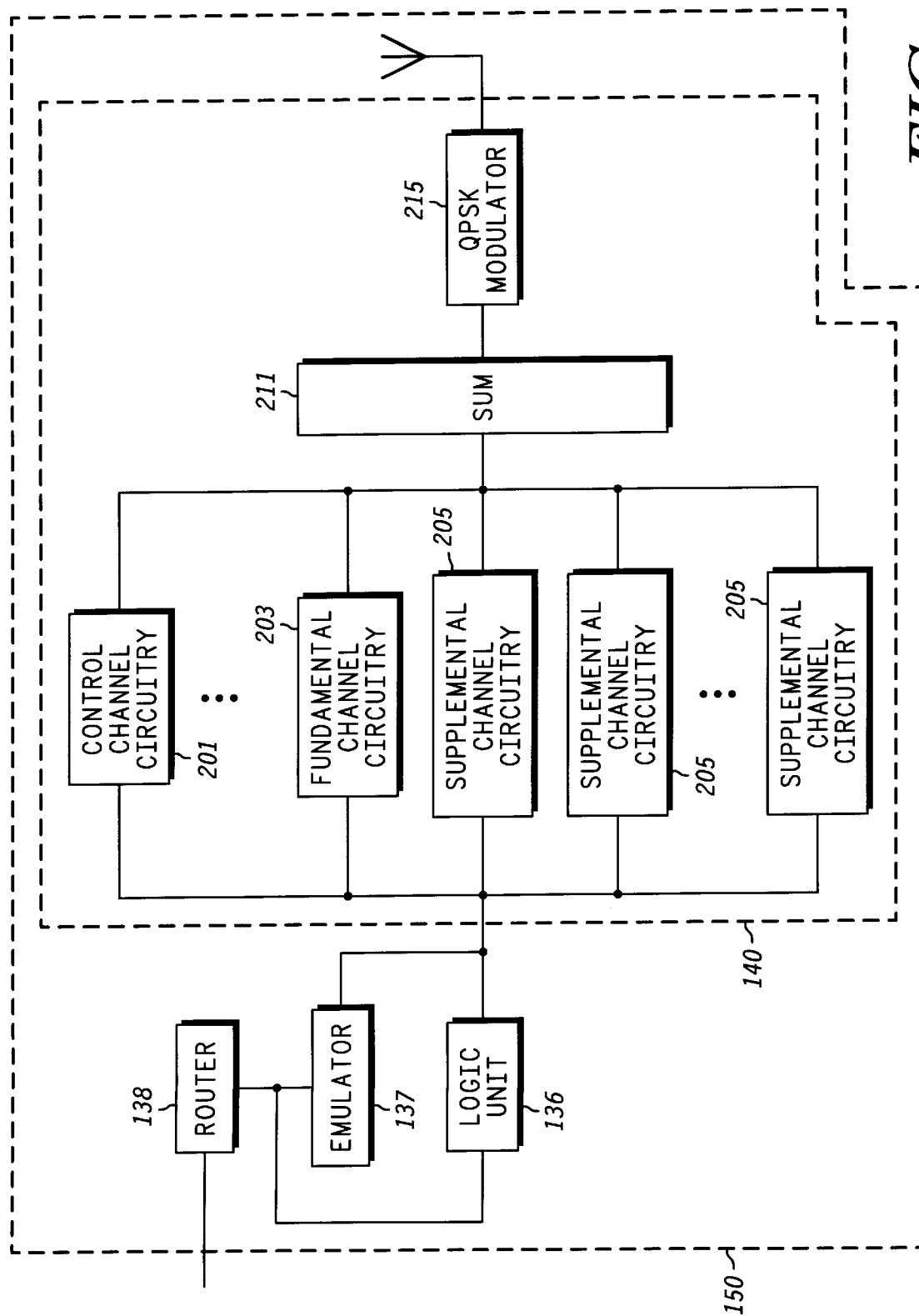
FIG. 2 is a block diagram of a base station of FIG. 1 in accordance with the preferred embodiment of the present invention.

FIG. 2 is a block diagram of base station 130 of FIG. 1 in accordance with the preferred embodiment of the present invention. Base station 130 comprises logic unit 136, emulator 137, router 138, transmit/receive circuitry 140 comprising one or more common control channel circuits 201, one or more fundamental channel circuits 203, one or more supplemental channel circuits 205, summer 211, and modulator 215. In the preferred embodiment of the present invention, communication to remote unit 113 may take place utilizing the supplemental channel circuitry 205 and/or fundamental channel circuitry 203. In particular, base station 130 utilizes two classes of channels defined for both forward and reverse transmission. In the preferred embodiment, the fundamental channels are similar to existing CDMA traffic channels used for voice and signaling, except spread over a wider bandwidth. Similarly, the common control channel is used for passing system information and control signaling, along with multicast advertisement information. When transmitting a multicast session, fundamental channels or common control channels are utilized to transmit emulated Internet Group Management Protocol (IGMP) messages for subscribing and de-subscribing to a multicast session. CDMA traffic and common control channels are described in detail in IS-95A as well as the RTT Candidate Submission Document. Additionally, soft handoff (simultaneous communication utilizing more than one fundamental channel circuit 203) is supported utilizing fundamental channel circuitry 203. Supplemental channel circuitry 205 are utilized for communicating high data rate services (e.g., multicast packet data) to remote unit 113. The data rate of the supplemental channels is specified prior to transmission. Multiple data sources are time multiplexed on this channel. In addition, the Quality-of-Service (e.g., Frame Error Rate (FER), Bit Error Rate (BER) and/or Transmission Delay) of this channel may be set and operated independently of the fundamental channel.

Data transmission and channel assignment from base station 130 in accordance with the preferred embodiment of the present invention occurs as follows: Reverse Access (Common Control) channel circuitry receives a subscribe message from a remote unit to join a multicast session. As described above, the subscribe message comprises an emulated IGMP message for subscribing to the multicast session. Logic unit 136 determines if it is currently subscribed to the requested multicast session (i.e., another remote unit is currently subscribed to the session) and if so, an acknowledgment (Ack) message is Stilt to the remote unit. In the preferred embodiment of the present invention the Ack message contains the current channel (i.e., the assigned Walsh code and the long code), with the long code being a function of the multicast IP address. In other words, the Ack message contains the Supplemental Channel Walsh code and long code that is used by the remote unit to demodulate the multicast session. In the preferred embodiment, if base station 130 is not currently subscribed to the multicast session, logic unit 136 determines the multicast address and sends a query message to router 138 requesting to join the multicast session. In turn router 138 sends an IGMP message to an upstream router that is located within the PSTN/Internet network 122. This process continues until a upstream router that is currently receiving the multicast session is located. In the preferred embodiment this is accomplished by sending an IGMP message to router 138 as described in RFC 1112 and/or RFC 2236. Thereafter, base station 130 sends an Ack message to the remote unit.

Although the above description was given with respect to a single remote unit, multiple remote units may join the multicast session in a similar manner, resulting in multiple remote units utilizing the same spreading codes (i.e., Walsh and long codes) to de-scramble the particular session. Additionally, multiple multicast sessions can be simultaneously broadcast from a single base station, resulting in at least a first group of remote units utilizing a first spreading code based on an address for a first multicast transmission, and a second group of remote units utilizing a second spreading code based on an address for a second multicast transmission.

Figure 3:
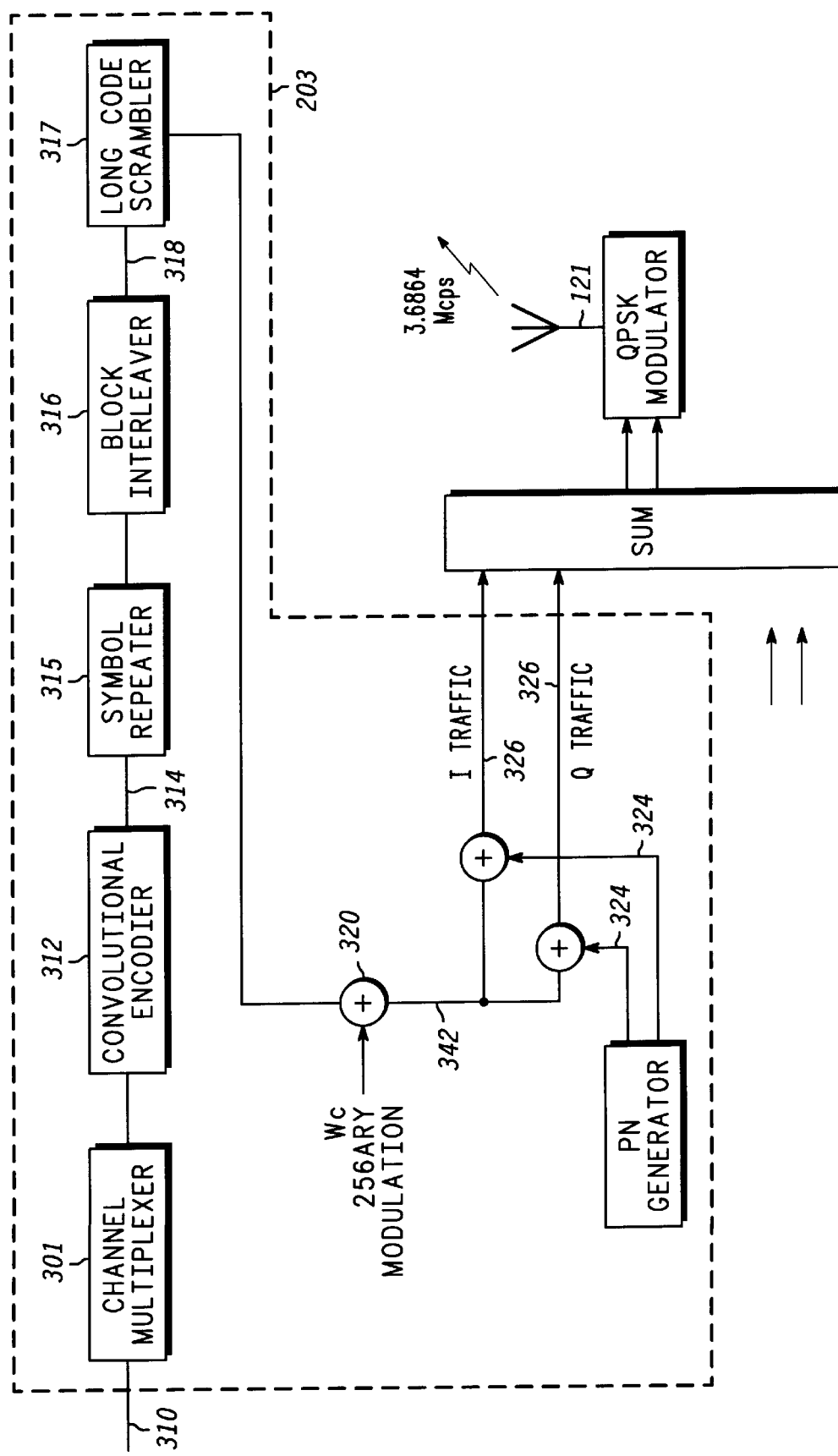
FIG. 3 is a block diagram of fundamental channel circuitry of FIG. 2 for sending control messages to a remote unit in accordance with the preferred embodiment of the present invention.

FIG. 3 is a block diagram of fundamental channel circuitry 203 of FIG. 2 for sending control messages to remote units in accordance with the preferred embodiment of the present invention. Fundamental channel circuitry 203 includes channel multiplexer 301, convolutional encoder 312, symbol repeater 315, block interleaver 316, long code scrambler 317, and orthogonal encoder 320. During operation, data bits 310 (emulated IGMP message to be transmitted over the air interface) are received by channel multiplexer 301 at a particular bit rate. Emulated IGMP message 310 typically includes control messages such as Subscribe and De-subscribe messages. Channel multiplexer 301 multiplexes secondary traffic (e.g., data), and/or signaling traffic (e.g. control or user messages) onto the emulated IGMP message 310 and outputs the multiplexed data at 9.6 kbit/sec to convolutional encoder 312. Convolutional encoder 312 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 312 encodes input data bits 310 (received at a rate of 9.6 kbit/second) at a fixed encoding rate of one data bit to two data symbols (i.e., rate ⅓) such that convolutional encoder 312 outputs data symbols 214 at a 28.8 ksymbol/second rate.

Data symbols 314 are then repeated by repeater 315 and input into interleaver 316. Interleaver 316 interleaves the input data symbols 314 at the symbol level. In interleaver 316, data symbols 314 are individually input into a matrix which defines a predetermined size block of data symbols 314. Data symbols 314 are input into locations within a matrix so that the matrix is filled in a column by column manner. Data symbols 314 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 316 at the same data symbol rate that they were input (e.g., 28.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 28.8 ksymbol/second times 20 milliseconds which equals 576 data symbols which defines a 18 by 32 matrix.

Interleaved data symbols 318 are scrambled by scrambler 317 and output to orthogonal encoder 320. In particular, long code scrambler 317 scrambles symbols 318 by modulo 2 adding symbols 318 with a user-specific Long Code. The scrambled symbols are then output to orthogonal encoder 320, where encoder 320 modulo 2 adds an orthogonal code (e.g., a 256-ary Walsh code) to each interleaved and scrambled data symbol 318. For example, in 256-ary orthogonal encoding, interleaved and scrambled data symbols 318 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 320 repetitively outputs a Walsh code which corresponds to input data symbol 318 at a fixed symbol rate (e.g., 28.8 ksymbol/second).

Sequence of Walsh codes 342 are further spread by a pair of short pseudorandom codes 324 (i.e. short when compared to the long code) to generate an I-channel and Q-channel code spread sequence 326. The I-channel and Q-channel code spread sequences 326 are used to bi-phase modulate a quadrature pair of sinusoids by driving the power level controls of the pair of sinusoids. The sinusoids output signals are summed, QPSK modulated (by modulator 215) and radiated by antenna 121 to complete transmission of channel data bits 310. In the preferred embodiment of the present invention, spread sequences 226 are output at a rate of 3.6864 Mega Chips per second (Mcps) and radiated within a 5 MHz bandwidth, but in alternate embodiments of the present invention, spread sequences 226 may be output at a different rate and radiated within a different bandwidth. For example, in an alternate embodiment of the present invention an IS-95A transmission scheme may be utilized where spread sequences 326 are output at a rate of 1.2288 Mcps (traffic channel chip rate) within a 1.25 MHz bandwidth.

Figure 4:
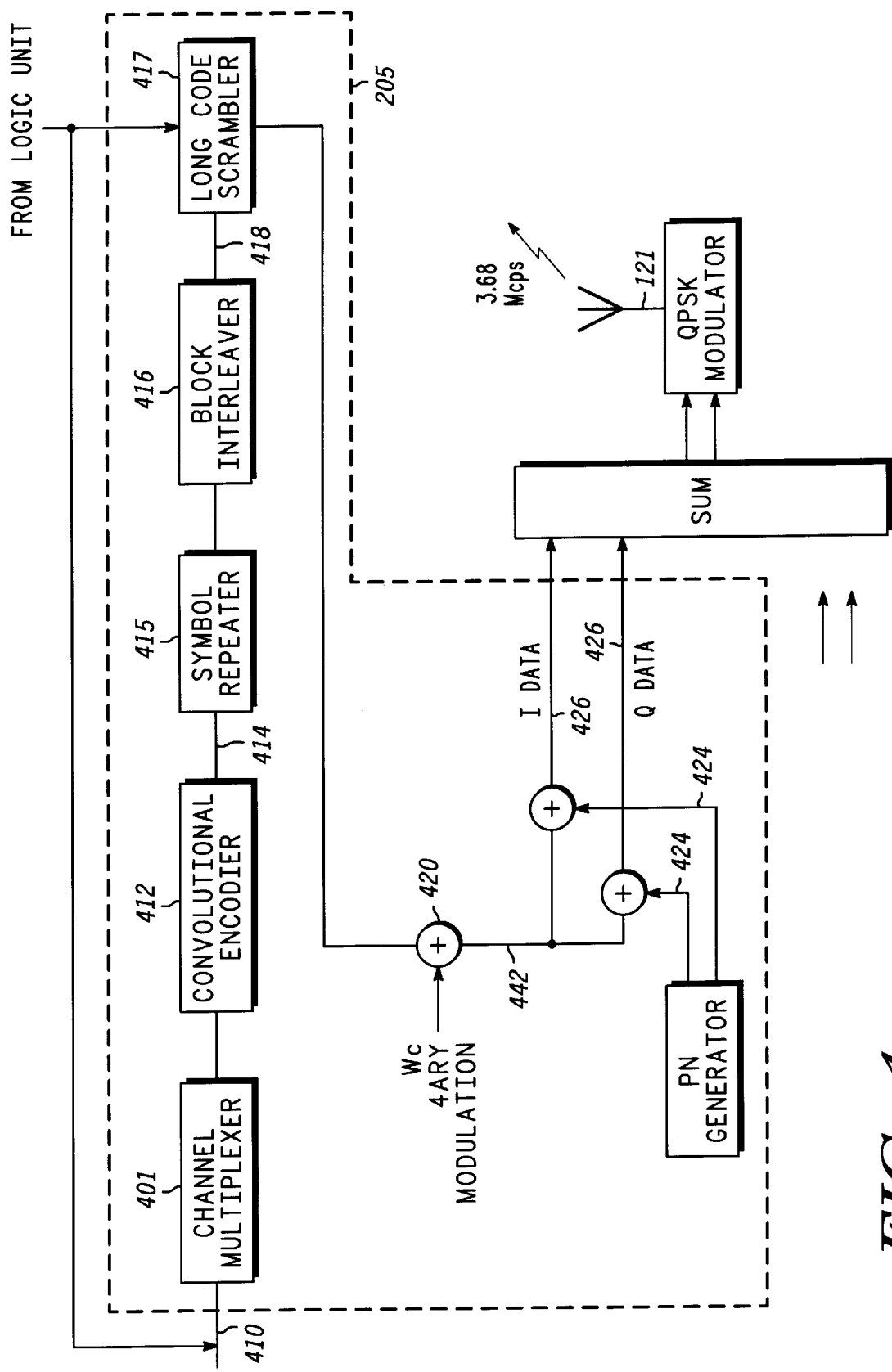
FIG. 4 is a block diagram of supplemental channel circuitry of FIG. 2 for transmitting data in accordance with the preferred embodiment of the present invention.

FIG. 4 is a block diagram of supplemental channel circuitry 205 of FIG. 2 for transmitting data (e.g., multicast traffic) in accordance with the preferred embodiment of the present invention. Supplemental channel circuitry 205 includes channel multiplexer 401, convolutional encoder 412, symbol repeater 415, block interleaver 416, and orthogonal encoder 420. During operation, signal 410 (multicast packet data) is received by channel multiplexer 401 at a particular bit rate (e.g., 152.4 kbit/second). Channel multiplexer 401 multiplexes secondary traffic (e.g., user data onto the supplemental channel data 410 and outputs the multiplexed data to convolutional encoder 412 at 153.6 kb/s. Convolutional encoder 412 encodes input data bits 410 into data symbols at a fixed encoding rate with an encoding algorithm which facilitates subsequent maximum likelihood decoding of the data symbols into data bits (e.g. convolutional or block coding algorithms). For example, convolutional encoder 412 encodes input data bits 410 (received at a rate of 153.6 kbit/second) at a fixed encoding rate of one data bit to two data symbols (i.e., rate ⅓) such that convolutional encoder 412 outputs data symbols 414 at a 460.8 kbit/second rate.

Data symbols 414 are then input into interleaver 416. Interleaver 416 interleaves the input data symbols 414 at the symbol level. In interleaver 416, data symbols 414 are individually input into a matrix which defines a predetermined size block of data symbols 414. Data symbols 414 are input into locations within a matrix so that the matrix is filled in a column by column manner. Data symbols 414 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 418 are output by interleaver 416 at the same data symbol rate that they were input (e.g., 460.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 9.216 ksymbols.

Figure 5:
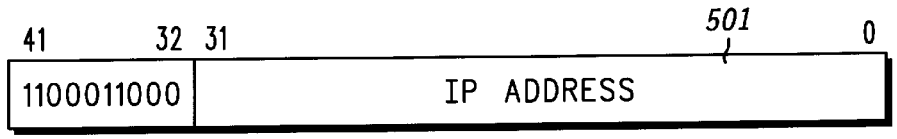
FIG. 5 is an illustration of a long spreading code in accordance with the preferred embodiment of the present invention.

Interleaved data symbols 418 are scrambled by scrambler 417 and output to orthogonal encoder 320. In particular, long code scrambler 417 scrambles symbols 418 by modulo 2 adding symbols 418 with a group-specific long code. As shown in FIG. 5, the group-specific long code is a function of a specific address (IP address) for server 120. In the preferred embodiment of the present invention the least significant 32 bits of the multicast session address 501 are utilized as the group-specific long code along with a 10 bit header, resulting in a long code having the session address 501 embedded therein.

Continuing, the scrambled symbols are then output to orthogonal encoder 420, where encoder 420 modulo 2 adds an orthogonal code (e.g., a 16-ary Walsh code) to each interleaved and scrambled data symbol 418. In the preferred embodiment of the present invention, each multicast session utilizes the same spreading (Walsh) code for every remote unit 113–117 participating in the multicast session. Thus, the same 16-ary spreading code is utilized by all remote units currently participating in the multicast session. In 16-ary orthogonal encoding, interleaved and scrambled data symbols 418 are each exclusive OR'd by a 16 symbol orthogonal code. These 16 orthogonal codes preferably correspond to Walsh codes from a 16 by 16 Hadamard matrix wherein a Walsh code is a single row or column of the matrix. Orthogonal encoder 420 repetitively outputs a Walsh code or its inverse which corresponds to input data symbol 418 at a fixed symbol rate (e.g., 460.8 ksymbol/second).

Sequence of weighted Walsh codes 442 are further spread by a pair of short pseudorandom codes 424 (i.e. short when compared to the long code) to generate an I-channel and Q-channel code spread sequence 426. The I-channel and Q-channel code spread sequences 426 are used to bi-phase modulate a quadrature pair of sinusoids by driving the power level controls of the pair of sinusoids. The sinusoids output signals are summed, QPSK modulated (by modulator 215) and radiated by antenna 121 to complete transmission of channel data bits 410. In the preferred embodiment of the present invention, spread sequences 426 are output at 3.6864 Mcps and radiated within a 5 MHz bandwidth.

Figure 6:
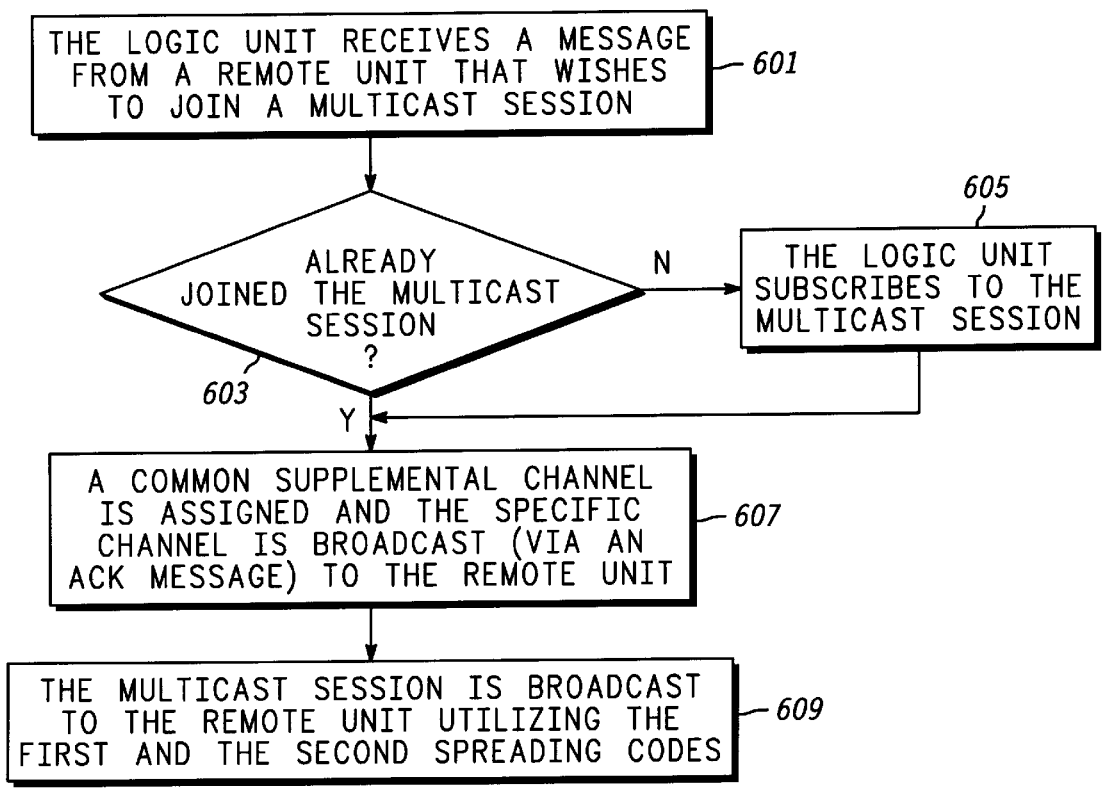
FIG. 6 is a flow chart illustrating operation of the logic unit of FIG. 1 in accordance with the preferred embodiment of the present invention.

FIG. 6 is a flow chart illustrating operation of the logic unit of FIG. 1 in accordance with the preferred embodiment of the present invention. The logic flow begins at step 601 where logic unit 136 receives a message (IGMP subscribe message) from a remote unit that wishes to join a multicast session. Next, at step 603, logic unit 136 determines if it has already joined the multicast session. In particular, logic unit 136 determines if any remote unit in communication with base station 130 is already subscribed to the multicast session, and if not the logic flow continues to step 605, otherwise the logic unit continues to step 607. At step 605 logic unit determines the address for the multicast session and subscribes to the multicast session by IGMP messaging as described in RFC 1112 and RFC 2236, and the logic flow continues to step 607. At step 607 a common supplemental channel is assigned and the specific channel is broadcast (via an Ack message) to the remote unit. As discussed above two particular spreading codes are utilized by all remote units participating in the multicast session. The first spreading code is a Walsh code unique to the RF channel, and the second spreading code is a group-specific long that comprises the specific multicast session address (IP address) from the multicast server 120. Finally, at step 609 the multicast session is broadcast to the remote over an air interface via a channel defined by the first and the second spreading codes.

Figure 7:
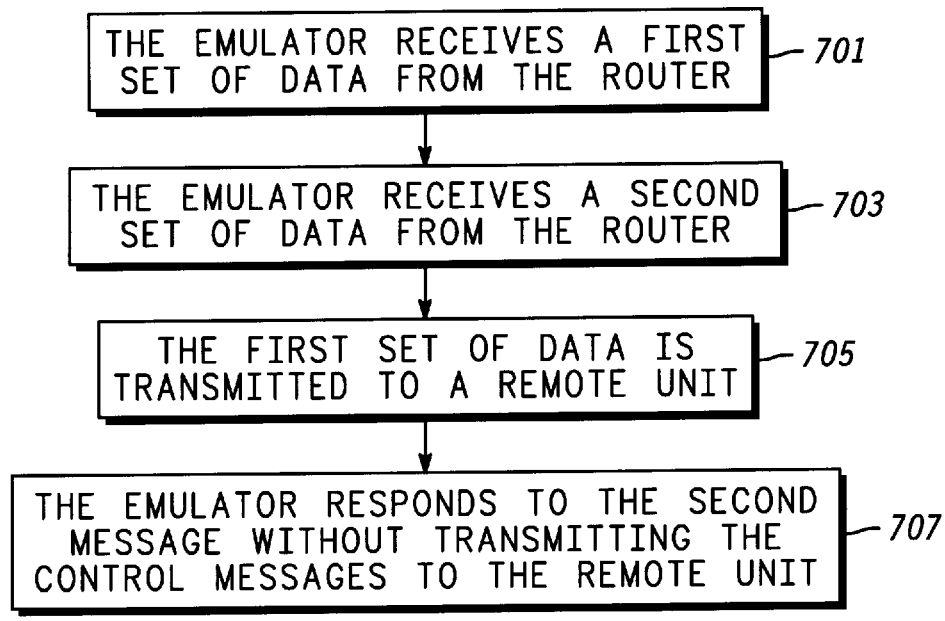
FIG. 7 is a flow chart illustrating operation of the emulator of FIG. 1 in accordance with the preferred embodiment of the present invention.

FIG. 7 is a flow chart illustrating operation of the emulator of FIG. 1 in accordance with the preferred embodiment of the present invention. The logic flow begins at step 701 where emulator 137 receives a first set of data from router 138. In the preferred embodiment of the present invention the first set of data is multicast packet data transmitted from server 120 and destined to at least one remote unit communicating with base station 130. Next, at step 703, emulator 137 receives a second set of data from router 138. In the preferred embodiment of the present invention the second set of data is control data for the first set of data (current multicast session) being broadcast from server 120. In particular, the second set of data is IGMP messaging 132 as described in RFC 1112 and RFC 2236 as published by IETF. Next, at step 705, the first set of data is transmitted to a remote unit over an air interface as discussed above with reference to FIG. 4. Finally, at step 707, emulator 137 responds to the second set of data (via response message 134) without transmitting the control messages to the remote unit. In particular, certain IGMP messages such as Membership Query Messages, Leave Group Messages, and Membership Report Messages require a response from the recipient of the multicast session. In order to reduce transmission over the air interface, only the first set of data is transmitted to the remote unit, while emulator 137 responds to the particular IGMP message via response message 134. This approach increases system capacity in a wireless CDMA network since unnecessary transmissions (e.g., IGMP messages) over the air interface are reduced. In the preferred embodiment a remote unit only transmits subscribe and de-subscribe (emulated IGMP messages). Furthermore, no IGMP messages described in RFC 1112 and RFC 2236 are transmitted over the air interface.

Figure 8:
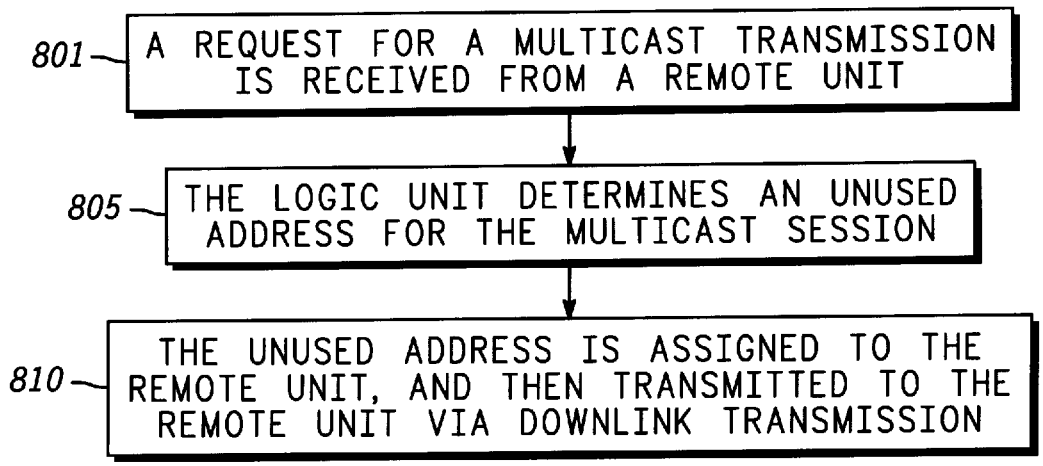
FIG. 8 is a flow chart showing operation of the base station of FIG. 1 in accordance with the preferred embodiment of the present invention when a multicast transmission originates from a remote unit.

FIG. 8 is a flow chart showing operation of base station 130 when a multicast transmission originates from a remote unit in communication with base station 130. In other words, instead of originating from server 120, the multicast transmission is now originating from a remote unit in communication with base station 130. The logic flow begins at step 801 where a request for a multicast transmission is received from a remote unit. Next, at step 805 logic unit 136 determines an unused address for the multicast session. In particular, as described in RFC 1112 and RFC 2236, logic unit 136 determines unused IP addresses by listening to IGMP messages. At step 810, the unused address is assigned to the remote unit, and then transmitted to the remote unit via downlink transmission. The IP address is then utilized by the remote unit and is embedding into an IP header and is used as the multicast address as described in RFC 112 and RFC 2236. This approach increases system capacity in a wireless CDMA network since no multicast control messages (e.g., IGMP messages) are transmitted over the air interface.

While the invention has been particularly shown and described with reference to a particular embodiment, it will be understood by those skilled in the art that various changes in form and details may be made therein without departing from the spirit and scope of the invention and it is intended that all such changes come within the scope of the following claims and their equivalents:

What is claimed is:

1. A method for a base station to transmit data within a wireless communication system, the method comprising the steps of:

receiving, by the base station a first set of data destined for a remote unit;

receiving, by the base station a second set of data representative of control messages for the first set of data, wherein the second set of data requires a response from the remote unit;

transmitting, by the base station the first set of data to the remote unit; and emulating the remote unit by the base station by sending an emulated response to the second set of data without transmitting the second set of data or the emulated response over the air.

2. The method of claim 1 wherein the step of receiving the first set of data comprises the step of receiving multicast data.

3. The method of claim 2 wherein the step of receiving multicast data comprises the step of receiving multicast data transmitted from a server over an internet/Public Switched Telephone Network (PSTN).

4. The method of claim 1 wherein the step of receiving the second set of data comprises receiving control data for a multicast session.

5. The method of claim 4 wherein the step of receiving control data comprises the step of receiving an Internet Group Management Protocol (IGMP) message.

6. The method of claim 1 wherein the step of transmitting the first set of data comprises the step of transmitting the first set of data over an air interface within the wireless communication system.

7. A base station used for data transmission within a wireless communication system, the base station comprising:

a remote unit emulator having a first set of data destined for the remote unit and a second set of data as inputs, wherein the second set of data requires a response from the remote unit, the emulator outputting the first set of data for transmission over an air interface to the remote unit, while outputting an emulated response to the second set of data without transmitting the second set of data or the emulated response over the air.

8. The base station of claim 7 wherein the first set of data comprises multicast data.

9. The base station of claim 8 wherein the multicast data comprises multicast data transmitted from a server over an internet/Public Switched Telephone Network (PSTN).

10. The base station of claim 7 wherein the second set of data comprises data for a multicast session.

11. The base station of claim 10 wherein the control data comprises an Internet Group Management Protocol (IGMP) message.

* * * * *